United States Patent
Lam et al.

(10) Patent No.: US 10,257,249 B1
(45) Date of Patent: Apr. 9, 2019

(54) METHOD AND SYSTEM FOR COMMUNICATING CONTENT TO A CLIENT DEVICE BY PULLING CONTENT FROM A PUBLISHER FROM A CONTENT DELIVERY NETWORK WHEN FIRST REQUESTED BY THE CLIENT DEVICE

(71) Applicant: The DIRECTV Group, Inc., El Segundo, CA (US)

(72) Inventors: Thai Lam, Torrance, CA (US); Michael A. Makhijani, Playa Vista, CA (US); Michael S. Xie, Hacienda Heights, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 772 days.

(21) Appl. No.: 13/767,499

(22) Filed: Feb. 14, 2013

(51) Int. Cl.
*H04L 29/08* (2006.01)

(52) U.S. Cl.
CPC .................................. *H04L 67/02* (2013.01)

(58) Field of Classification Search
USPC ......................... 709/201–204, 217–219, 232
See application file for complete search history.

(56) References Cited

U.S. PATENT DOCUMENTS

| | | | |
|---|---|---|---|
| 6,578,113 B2 * | 6/2003 | Krishnamurthy | ............................ G06F 17/30902 707/E17.12 |
| 7,707,182 B1 * | 4/2010 | Kee | ................... G06F 17/30194 707/638 |
| 8,387,100 B1 * | 2/2013 | Wasilewski | ...................... 725/93 |
| 8,392,530 B1 * | 3/2013 | Manapragada et al. | ...... 709/219 |
| 2003/0187917 A1 * | 10/2003 | Cohen | ................. H04L 67/1095 709/203 |
| 2006/0095945 A1 * | 5/2006 | Carpenter et al. | ............... 725/87 |
| 2007/0276925 A1 * | 11/2007 | La Joie et al. | ................ 709/219 |
| 2008/0098101 A1 * | 4/2008 | Black et al. | .................. 709/223 |
| 2008/0222281 A1 * | 9/2008 | Dilley | ..................... H04L 29/06 709/223 |
| 2009/0030941 A1 * | 1/2009 | Jacobs | ....................... 707/104.1 |
| 2009/0089843 A1 * | 4/2009 | Kahn | ..................... H04N 7/165 725/82 |
| 2009/0164777 A1 * | 6/2009 | Chaudhry | ..................... 713/159 |

(Continued)

OTHER PUBLICATIONS

Cohen, Edith, and Haim Kaplan. "Proactive caching of DNS records: Addressing a performance bottleneck." Computer Networks 41.6 (2003): 707-726.*

(Continued)

*Primary Examiner* — Suraj M Joshi
*Assistant Examiner* — Melaku Y Habtemariam
(74) *Attorney, Agent, or Firm* — Harness, Dickey & Pierce, P.L.C.

(57) ABSTRACT

A content delivery network and method for operating the same includes a content delivery network (CDN) origin server and a content delivery network edge server receiving a request for a first content from a first client device and communicating the request for the first content to the content delivery network origin server. The CDN origin server communicates a pull signal to a publisher origin server when the request for the first content is a first request, receives the first content from the publisher origin server and stores the first content. The CDN origin server communicates the first content to the first client through the CDN edge server.

11 Claims, 4 Drawing Sheets

(56) References Cited

U.S. PATENT DOCUMENTS

| | | | | |
|---|---|---|---|---|
| 2011/0060812 A1* | 3/2011 | Middleton | ........ | G06F 17/30902 |
| | | | | 709/219 |
| 2011/0225417 A1* | 9/2011 | Maharajh | ................ | G06F 21/10 |
| | | | | 713/150 |
| 2012/0209942 A1* | 8/2012 | Zehavi | .............. | H04L 29/08729 |
| | | | | 709/213 |
| 2012/0311091 A1* | 12/2012 | Dingler et al. | ............... | 709/219 |
| 2013/0103785 A1* | 4/2013 | Lyon | ............................ | 709/217 |
| 2013/0174272 A1* | 7/2013 | Chevalier | ............... | G06F 21/10 |
| | | | | 726/28 |

OTHER PUBLICATIONS

Sourlas, Vasilis, Georgios S. Paschos, Paris Flegkas, and Leandros Tassiulas. "Caching in content-based publish/subscribe systems." In Global Telecommunications Conference, 2009. Globecom 2009. IEEE, pp. 1-6. IEEE, 2009.*

* cited by examiner

METHOD AND SYSTEM FOR COMMUNICATING CONTENT TO A CLIENT DEVICE BY PULLING CONTENT FROM A PUBLISHER FROM A CONTENT DELIVERY NETWORK WHEN FIRST REQUESTED BY THE CLIENT DEVICE

TECHNICAL FIELD

The present disclosure relates generally communicating content to a client device from publisher through a content delivery network, and, more specifically, to pulling content from the publisher using a content delivery network when first requested by the client device.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast from the satellite. Once access is provided the user can access the particular content. The broadcasting of a large selection of channels and pay-per-view programs uses a considerable amount of satellite resources.

Content providers are increasingly trying to determine additional ways to provide content to users. Some content may be desired by a small number of customers. In such a case using valuable satellite resources at peak viewing times may not be cost effective. Less popular content may be broadcast by satellite at less popular viewing times, or may be available for downloading on demand via a broadband connection. Such content may be received and stored by a digital video recorder for later viewing.

A content delivery network is typically used to deliver content to the client device. The content delivery network may be controlled by a separate entity compared to the provider of the broadcast services. Typically, a publisher actively transfers data to the content delivery network as the content becomes available. This is known as data push or data pre-cache. Such a method is effective when using a single content delivery network (CDN). However, many systems for providing a relatively large amount of content use multiple content delivery networks that are controlled by different entities. Content delivery networks typically have their own data push mechanisms and interfaces that require the provider to implement specific propriety logic to store data at each content delivery network.

SUMMARY

The present disclosure provides a method and system tor providing content that is pulled from the publisher when the content is first requested by a client. By using a content pull by the content delivery network support from each content delivery networks' proprietary pre-cache mechanism is eliminated.

In one aspect of the disclosure, a method of operating a content delivery network includes receiving a request for a first content from a first client device at a content delivery network (CON) edge server, communicating the request for the first content to a content delivery network origin server, when the request for the first content is a first request, communicating a pull signal from the content delivery network origin server to a publisher origin server, receiving the first content at the content delivery network origin server from the publisher origin server; storing the first content in the content delivery network after receiving and communicating the first content to the first client from the content delivery network edge server.

In a further aspect of the disclosure, a content delivery network includes a content delivery network (CDN) origin server and a content delivery network edge server receiving a request for a first content from a first client device and communicating the request for the first content to the content delivery network origin server. The content delivery network origin server communicates a pull signal to a publisher origin server when the request for the first content is a first request, receives the first content from the publisher origin server and stores the first content. The content delivery network origin server communicates the first content to the first client through the content delivery network edge server.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
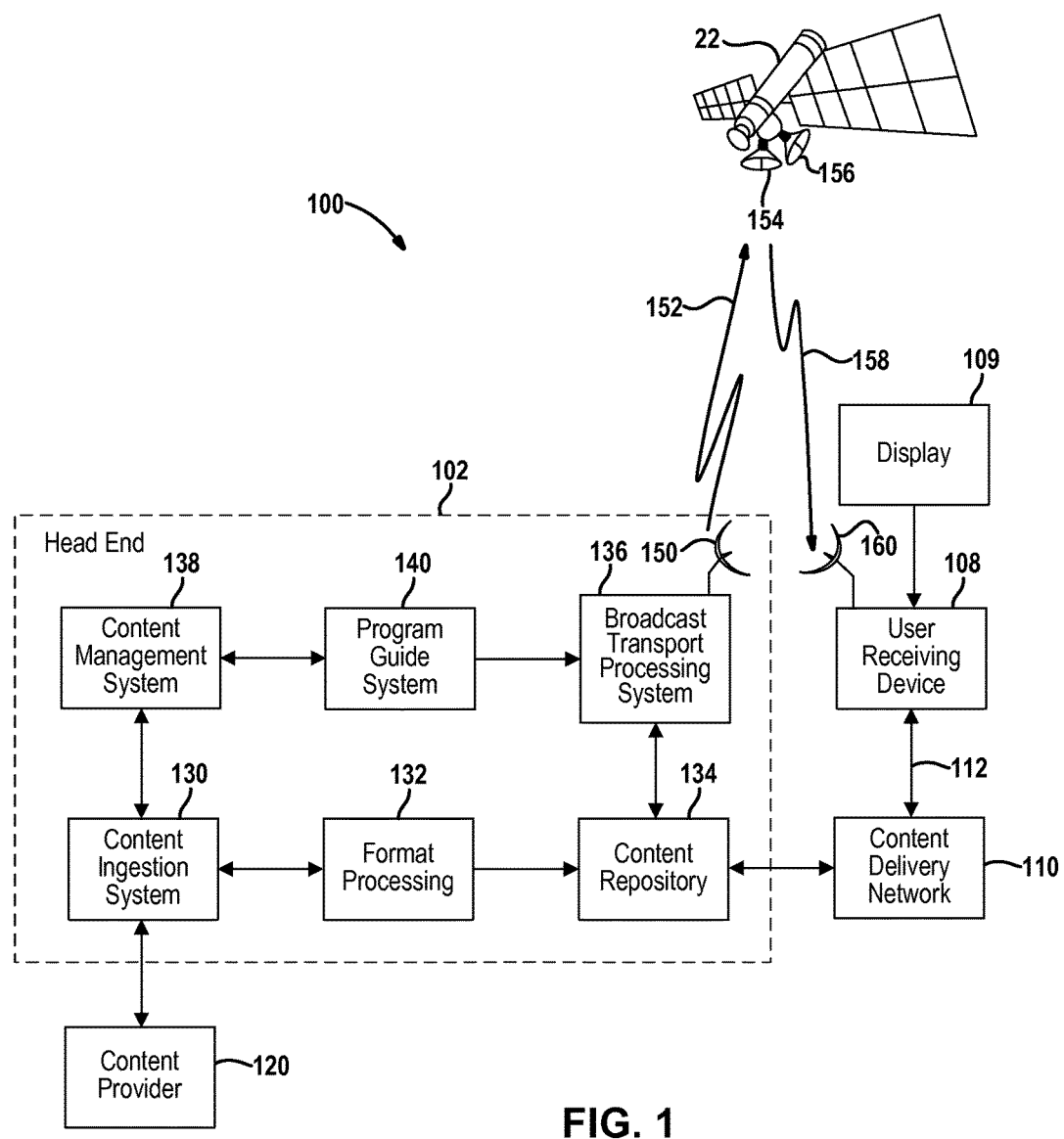
FIG. 1 is a schematic illustration of a communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. Insert detailed description.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a communication system 100 that includes a content processing system or headend 102 used as a processing and transmission source. The headend 102 is in communication with a satellite 106. The satellite 106 may communicate different types of communications or different portions of various contents from the headend 102. Wireless communications are exchanged between the content processing system 102 and the user devices 108. Only one user device 108 is illustrated. However, multiple user devices may be incorporated into the system 100.

The headend 102 may also be in communication with a content delivery network 110. The content delivery network 110 may also be used to communicate content, content portions or other data to the user device 108. The content delivery network 110 may be physically separate from the headend 102. The content delivery network 110 may be a separate entity than that of the headend service provider. That is, the content delivery network 110 may be employed or contracted by the headend 102 for the final leg of delivery. The content delivery network 110 may communicate content to the user receiving device 108 through various networks 112. The networks 112 may be one or more networks used for transmitting data therethrough. The network may include the internet, cellular system, broadband, optical fiber, other wired or wireless terrestrial-based systems or combination thereof.

The user receiving device 108 may be a fixed or mobile receiving device. The user receiving device 108 may also be referred to as a client. The user receiving device 108 may be a receiving device that receives television signals. The user receiving device 108 may also receive satellite television signals or cable television signals. The user receiving device 108 may also be used to receive other types of wireless television signals including over-the-air television signals. The user receiving device 108 displays content on a display 109 associated therewith. The display 109 may be a separate display or integrated display within the user receiving device 108.

A content provider 120 may be used for providing content and related metadata to the headend. The content provider 120 may provide scheduling information as well as ratings information director information, descriptions and the like.

The content provider 120 provides the content to a content ingestion system 130 that is disposed within the headend. The content ingestion system may receive content in various formats from different content providers 120. A format processing module 132 may be used to format the content into suitable formats for distribution through the content delivery network 110, the satellite 106 or other forms of communication between the headend 102 and the user receiving devices 108.

The content providers 120 may provide content in different manners to the content ingestion system 130. The content may be provided through a network in a file, by way of separate digital versatile discs, tapes or other means.

The formal processing module 132 may encode the packets using various types of encryption standards. The encryption may also depend on the type of ultimate broadcast such as through the satellite 106 or through the content delivery network 110.

Formatted content from the format processing module 132 may be stored within a content repository 134. The content repository 134 may save the content in various formats prior to communication through the content delivery network 110 or delivery to a broadcast transport processing system 136. The content repository 134 may include memory devices for storing the content therein. The content repository 134 may also include servers such as a publisher origin server that will be described in more detail below. A publisher origin server within the content repository 134 allows the content repository 134 to communicate content to the content delivery network 110.

A content management system 138 provides the program associated data to the program guide system 140. Likewise, the content management system 138 provides the channel information to the program guide system 140. Expiration data and a content delivery network identifier or address may also be associated with each content. The expiration data may include an expiration time or other data. The content management system 138 is in communication with the content ingestion system 130 to obtain the program associated data therefrom. The content management system 138 may also be used to associate various business rules such as pricing with the content and provide the business rule association to the program guide system 140.

The program guide data from the program guide system 140 is also communicated to the broadcast transport processing system 136. The broadcast transport processing system 136 provides the satellite content and the program guide content to an uplink antenna 150. The uplink antenna 150 communicates an uplink signal 152 to an uplink antenna 154 associated with the satellite. A downlink antenna 156 generates a downlink signal 158 corresponding to the uplink signal. The downlink signal 158 may contain the program guide data, the content or both. Of course, various other types of data may be included within the downlink signal 158.

A receiving antenna 160 is used to receive the downlink signal at the user receiving device 108.

Figure 2:
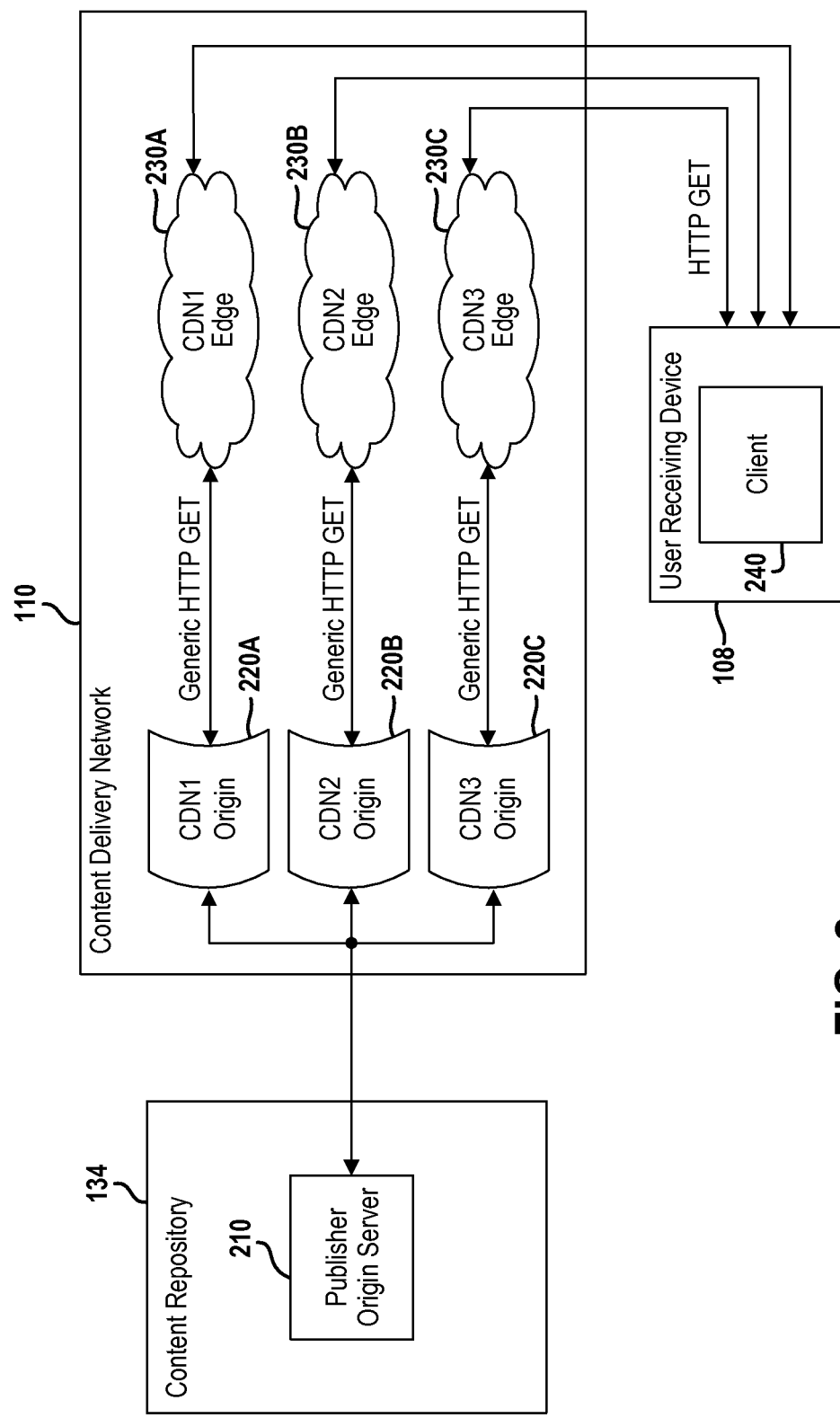
FIG. 2 is a detailed block diagrammatic view of a content delivery network according to the present disclosure.

Referring now to FIG. 2, details of the content repository 134, the content delivery network 110 and the user receiving device 108 are set forth. In particular, the content repository 134 may include a publisher origin server 210. The publisher origin server 210 is used to communicate with the content delivery network 110.

The content delivery network (CDN) 110 in this example includes a first content delivery network origin server 220A, a second origin server 220B and a third origin server 220C. As will be evident by the description below, the present system may use only one origin server. However, as mentioned above, such systems are typically large and serve a large number of clients and therefore a plurality of content delivery network origin servers may be used. The origin servers 220A, 220B and 22C are dedicated permanent storage servers.

Each origin server may be in communication with a respective content delivery network edge server. The CDN edge servers are shared temporary cache storage servers as opposed to the permanent origin servers. In this example a first content delivery network edge server 230A is in communication with the first content delivery network origin server 220A. A second content delivery network edge server 230B is in communication with the second content delivery network origin server 220B. The content delivery edge server 230C is in communication with the content delivery network origin server 220C.

The user receiving device 108 may include a client or be referred to in general as a client device 240. The client device 240 is in communication with the content delivery network 110. The client device 240 may generate a "get" command to the content delivery network. One example of a suitable get command is an HTTP get command. The particular content delivery network edge server that the client device 240 communicates with depends upon where the content is stored. The selection signal or get command may use the address in the program guide data to locate the proper content delivery network for the content. The same content may be stored on one or more content delivery network origin server. The client device 240 is thus in communication with the content delivery network edge server 230A, 230B or 230C that corresponds to the content delivery network origin server 220A, 220B or 220C that has the content to be delivered to the client device 240. The get command is generated by the client device 240 as a request for content. The first time such a request is generated is referred to as a first request. The content delivery network edge server to which the first request is generated, generates a generic HTTP get signal to the respective content delivery network origin server so that the content may ultimately be delivered to the client device 240 from the respective content delivery network edge server. As will be described below, the respective content delivery network origin server 220 may obtain the content from the publisher origin server 210 as a managed pull command when the content delivery network origin server does not have the content initially requested by the client. Subsequent requests for the same content do not require a managed pull command. However, the content delivery network origin server 220 obtains a validation of the content stored within the content delivery network on the second and subsequent requests for the same content. This process will be described further below.

Figure 3A:
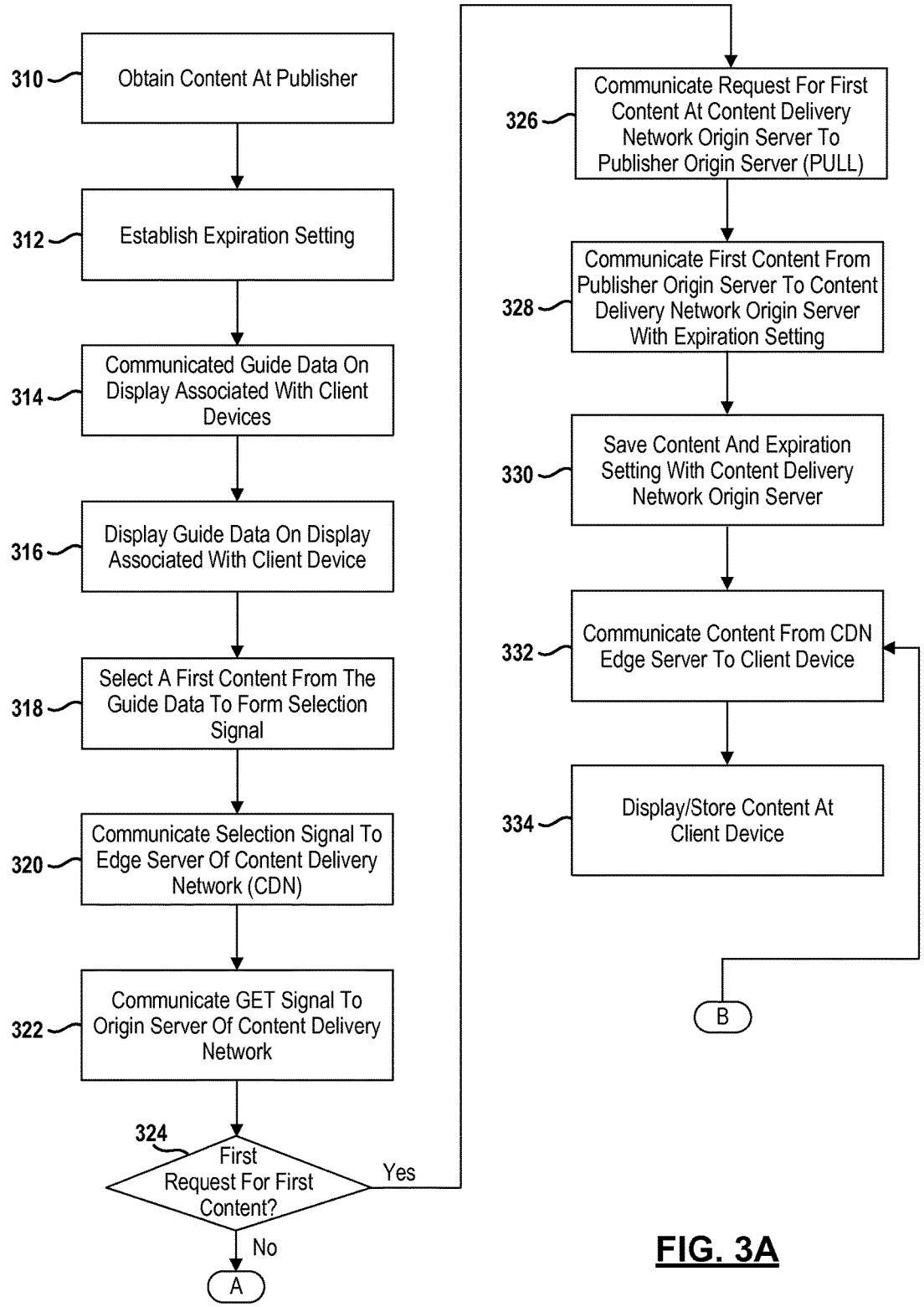
FIGS. 3A and 3B are a flow chart of a method for communicating content through a content delivery network.
Figure 3B:
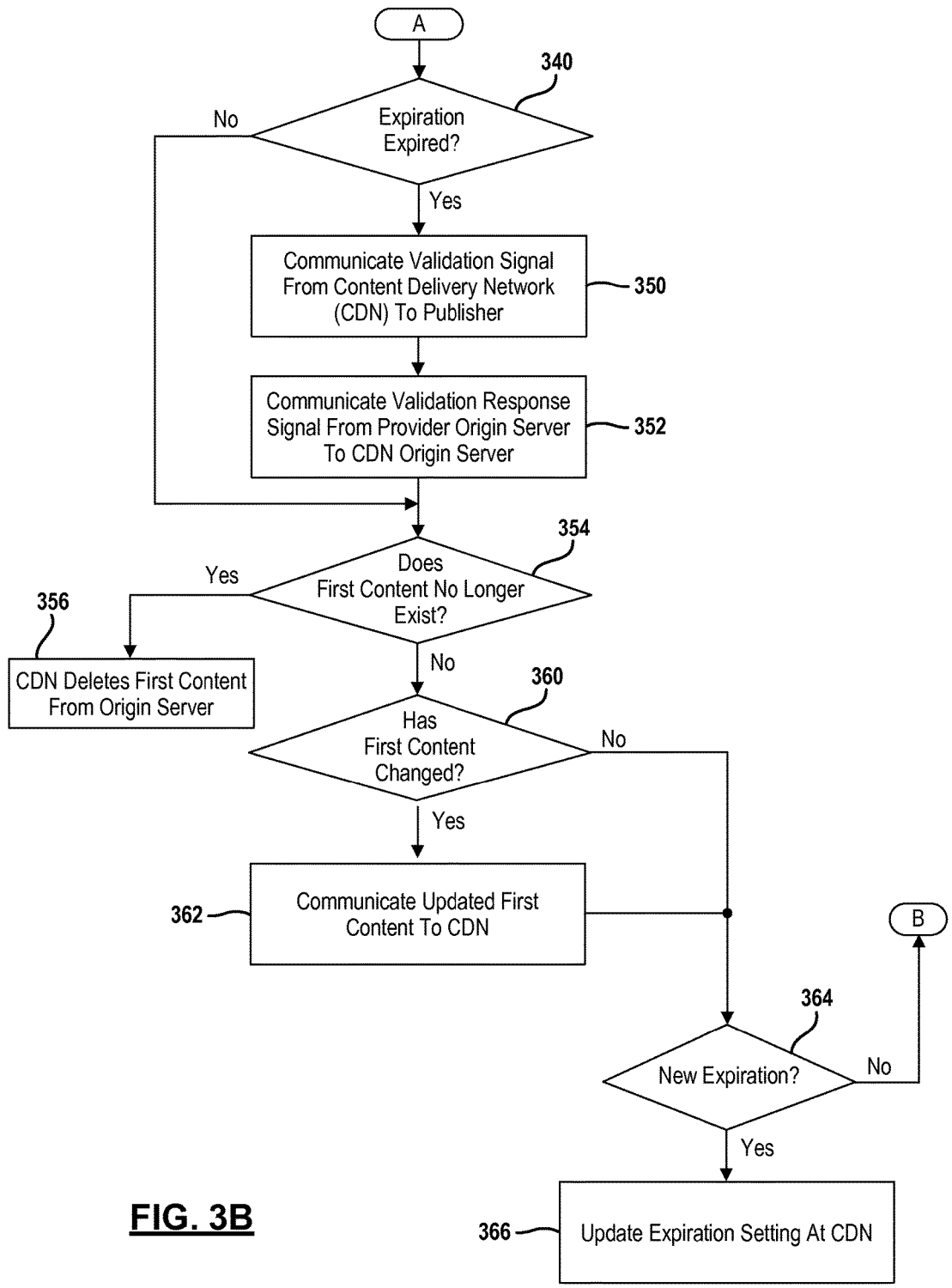

Referring now to FIG. 3, a method for publishing content to a client device is set forth. In step 310 the content is obtained at a publisher. In this example the publisher is the headend 102 and in particular the content repository 134 of the publisher illustrated in FIG. 1. Ultimately, the content is provided by the content provider 120 in the various manner described above.

In step 312 the headend establishes a content expiration setting for the content. The expiration setting may be set by the content management system 138 or may be provided by the content provider 120 illustrated in FIG. 1.

The content data corresponding to the received content is converted into guide data and the guide data is communicated to the client devices in step 314. As mentioned above, the program guide data may be communicated to the user receiving devices or client devices through the satellite 106. However, program guide data may also be communicated through the content delivery network and the network 112 as illustrated in FIG. 1. The guide data may include but is not limited to the content title, descriptions and the content delivery network address.

In step 316 the guide data is displayed on a display associated with the client device. The display 109 illustrated in FIG. 1 may be an integrated display or a separate display such as a television. In step 318 a first content selection is selected from the guide data to form a selection signal. A selection corresponds to a content that is desired to be transferred to the user receiving device from the headend.

In step 320 the selection signal is communicated to the edge server of the content delivery network. As mentioned above, this signal may be referred to as the get signal illustrated in FIG. 2. The get signal may be in HTTP get signal as mentioned above. The selection signal is communicated to the address of the appropriate content delivery network.

In step 322 the get signal is communicated from the content delivery network edge server to the content delivery network origin server that corresponds to the content delivery network edge server. By way of example, the get signal may be a generic HTTP get signal.

In step 324, it is determined whether the request for content or the selection signal is a first request for the selected content. If the request or selection signal corresponds to the first request for the selected content step 326 is performed. In step 326 a request for the selected content is communicated from the content delivery network origin server to the publisher origin server. This is referred to as a managed pull signal. In step 328 the selected content is communicated from the publisher origin server to the content delivery network origin server along with other settings such as an expiration setting. In step 330 the content and the content expiration setting a stored within the origin server of the content delivery network. In step 332 the content is communicated from the content delivery network edge server to the requesting client device. In step 334 the content is displayed or stored at the client device.

Referring back to step 324, if the request for content is not a first request for the selected content, step 340 is performed. In step 340 the expiration setting of the first content is checked. If the expiration time has passed, step 350 is performed. In step 350, a validation query signal is communicated from the content delivery network to the content publisher. In the present example the content delivery network origin server communicates the validation query signal to the publisher origin server that identifies the selected content. In step 352 a validation response signal is generated at the headend and, in particular, the publisher origin server. The validation response signal is communicated to the content delivery network. The validation response signal may include an indication as to whether the content exists, whether the content has changed and whether the expiration of the content has been changed.

After steps 252 and if the expiration has expired in step 340, Step 354 is performed. In step 354, the validation response signal is checked to determine if the content does not exist at the publisher origin server 210. If the first content no longer exists, step 356 is performed in which the content delivery network deletes the first content from the origin server.

Referring back to step 354 if the content does exist meaning that the content is still stored in the publisher origin server, step 360 is performed. In step 360 it is determined whether the first content had changed. That is, various portions of the content may have been changed. If the content has been changed, the updated content or update content file portion is communicated to the content delivery network in step 362. After step 360 if the content has not changed or the content had been updated, step 364 is performed. In step 364 it is determined whether a new expiration setting has been established for the first content. If a new expiration setting has been associated with the publisher origin server 210, step 366 updates the expiration setting at the content delivery network. If no new expiration is determined in step 364 or after step 366, step 332 is performed. As mentioned above, step 332 communicates the content from the content delivery network to the client device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of operating a content delivery network comprising:
   receiving a request for a first content from a first client device at a content delivery network edge server;
   communicating the request for the first content to a content delivery network origin server disposed in the content delivery network;
   when the request for the first content is a first request, communicating a pull signal from the content delivery network origin server to a publisher origin server;
   receiving the first content at the content delivery network origin server from the publisher origin server;
   storing the first content at the content delivery network origin server of the content delivery network after receiving the first content;
   communicating the content from the content delivery network origin server to the content delivery network edge server;
   communicating the first content to the first client from the content delivery network edge server;
   receiving a second request for the first content at the content delivery network edge server from a second client device;
   communicating a validation query signal from the content delivery network to the publisher origin server in response to receiving a second request;
   generating a validation response signal at the publisher origin server comprising an indication as to whether the first content exists at the publisher origin server by determining whether the first content is still stored in the publisher origin server, whether the first content has changed and whether the expiration of the first content has changed, said validation response signal different than and separate from the first content;
   receiving the validation response signal at the content delivery network from the publisher origin server in response to the validation query signal;
   in response to the validation response signal indicating that the first content does not exist by indicating the first content is not stored at the publisher origin server, deleting the first content from the content delivery network;
   in response to the validation response indicating the expiration has changed, updating an expiration time of the first content in the content delivery network when the expiration has been changed and communicating the first content to the second client device from the content delivery network edge server; and
   in response to the validation response signal indicating the content has changed, updating the first content with an updated first content file in the content delivery network when the first content has changed and the expiration time has not passed and communicating the first content to the second client device from the content delivery network edge server.

2. The method as recited in claim 1 further comprising receiving a second request for the first content at a content delivery network edge server and communicating the first content to a second client device from the content delivery network origin server through the content delivery network edge server.

3. The method as recited in claim 1 further comprising displaying the first content at the client device.

4. The method as recited in claim 1 wherein receiving the request for the first content from the first client device comprises receiving the first request for the first content from a user receiving device.

5. The method as recited in claim 1 wherein receiving the request for the first content from the first client device comprises receiving the first request for the first content from a television receiving device.

6. The method as recited in claim 1 wherein receiving the request for the first content from the first client device comprises receiving the first request for the first content from a satellite television receiving device.

7. A content delivery network comprising:
   a content delivery network origin server;
   a content delivery network edge server electronically receiving a request for a first content from a first client device and communicating the request for the first content to the content delivery network origin server disposed in the content delivery network;

said content delivery network origin server electronically communicating a pull signal to a publisher origin server when the request for the first content is a first request, receiving the first content from the publisher origin server and storing the first content after receiving the first content; said content delivery network origin server communicating the first content to the content delivery network edge server;

said content delivery network edge server electronically communicating the first content to the first client;

said content delivery network edge server receiving a second request for the first content from a second client device;

said content delivery network communicating a validation query signal to the publisher origin server in response to receiving a second request and receiving a validation response signal from the publisher origin server in response to the validation query signal, said validation response signal comprising an indication as to whether the first content exists at the publisher origin server by determining whether the first content is still stored in the publisher origin server, whether the first content has changed and whether the expiration of the first content has changed, said validation response signal different than and separate from the first content;

said content delivery network, deleting the first content when the first content has expired in response to the validation response signal indicating that the first content does not exist by indicating the first content is not stored at the publisher origin server;

said content delivery network updating an expiration time of the first content when the expiration has been changed and communicating the first content to the second client device from the content delivery network edge server in response to the validation response signal indicating the expiration has changed;

said content delivery network updating the first content with an updated first content file when first content has changed and the expiration time has not passed and communicating the first content to the second client device from the content delivery network edge server in response to the validation response signal indicating the content has changed.

8. The method as recited in claim 1 further comprising obtaining content at a publisher, establishing an expiration of the content, converting content data to guide data, communicating the guide data to client devices comprising the first client device and generating the request for the first content based on the content data.

9. A system comprising:
the publisher origin server disposed within a headend;
the content delivery network recited in claim 7; and
the first client device;
wherein the first client device comprises a user receiving device.

10. A system comprising:
the publisher origin server disposed within a headend;
the content delivery network recited in claim 7; and
the first client device;
wherein the first client device comprises a television receiving device.

11. A system comprising:
the publisher origin server disposed within a headend;
the content delivery network recited in claim 7; and
the first client device;
wherein the first client device comprises a satellite television receiving device.

* * * * *